United States Patent
Wang et al.

(10) Patent No.: US 11,358,492 B2
(45) Date of Patent: Jun. 14, 2022

(54) SELF-BALANCING SWITCHING CONTROL OF DUAL-PACK RECHARGEABLE ENERGY STORAGE SYSTEM WITH SERIES AND PARALLEL MODES

(71) Applicant: GM Global Technology Operations LLC, Detroit, MI (US)

(72) Inventors: Yue-Yun Wang, Troy, MI (US); Suresh Gopalakrishnan, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 864 days.

(21) Appl. No.: 16/120,639

(22) Filed: Sep. 4, 2018

(65) Prior Publication Data

US 2020/0070667 A1    Mar. 5, 2020

(51) Int. Cl.
| | | |
|---|---|---|
| *B60L 58/22* | (2019.01) | |
| *B60L 50/51* | (2019.01) | |
| *B60L 53/10* | (2019.01) | |
| *B60L 58/12* | (2019.01) | |

(52) U.S. Cl.
CPC .............. *B60L 58/22* (2019.02); *B60L 50/51* (2019.02); *B60L 53/11* (2019.02); *B60L 58/12* (2019.02); *B60L 2210/40* (2013.01)

(58) Field of Classification Search
CPC .......... B60L 53/11; B60L 58/12; B60L 58/22; B60L 50/51; H02J 7/0014–0019; H02J 7/0024
USPC ......................................................... 320/109
See application file for complete search history.

(56) References Cited

U.S. PATENT DOCUMENTS

| | | | |
|---|---|---|---|
| 9,252,603 B2 | 2/2016 | Shim | |
| 2008/0072859 A1* | 3/2008 | Esaka | H02J 7/0024 123/179.3 |
| 2012/0105001 A1* | 5/2012 | Gallegos | H02J 7/0027 320/109 |
| 2016/0114692 A1* | 4/2016 | Tripathi | H02J 7/0021 320/109 |
| 2016/0301222 A1* | 10/2016 | Samuel | H02J 7/0021 |
| 2018/0093583 A1* | 4/2018 | Kim | H02J 7/0091 |
| 2018/0166750 A1* | 6/2018 | Chang | B60L 53/14 |

(Continued)

FOREIGN PATENT DOCUMENTS

WO    WO-2018145150 A1 *    8/2018    ............ H01M 50/10

*Primary Examiner* — Jerry D Robbins
(74) *Attorney, Agent, or Firm* — Quinn IP Law

(57) ABSTRACT

An electrical system includes a rechargeable energy storage system (RESS) and a controller. The RESS includes first and second battery packs connected to a voltage bus, each pack having a respective plurality of battery cells and a corresponding cell balancing circuit. The RESS further includes switches that selectively connect or disconnect the packs to or from each other to achieve series and parallel modes. The controller executes a method by detecting a requested series to parallel mode transition. Responsive to a threshold imbalance being present in a state of charge or pack voltage of the packs relative to each other, the controller balances the state of charge/voltage using open/closed state control of the cell balancing circuits, and possibly a switching block having PWM-controlled switches and a circuit element. The controller may execute the requested mode transition upon balancing.

20 Claims, 5 Drawing Sheets

(56) References Cited

U.S. PATENT DOCUMENTS

2019/0126761 A1* 5/2019 Verbridge .......... H01M 50/502
2019/0363311 A1* 11/2019 Crowley ............... H01M 50/10

* cited by examiner

SELF-BALANCING SWITCHING CONTROL OF DUAL-PACK RECHARGEABLE ENERGY STORAGE SYSTEM WITH SERIES AND PARALLEL MODES

INTRODUCTION

A rechargeable energy storage system (RESS) is a key component of a high-voltage electrical system. When embodied as a battery electric system, an RESS in charging mode stores electrochemical energy in strings of battery cells. The RESS delivers the stored energy to a connected load during a discharging mode, such as a drive mode when the RESS is used as part of an electrified powertrain. The battery cells may be recharged using an offboard alternating current (AC) charging station. Alternatively, a DC fast-charging station may be used to deliver a high-voltage charging current to the RESS.

Due to differences in cell temperature and internal resistance of the individual battery cells within the RESS, as well as other factors, a given battery cell may possess a cell voltage or state of charge that is higher or lower than other cells in the RESS. Such cell imbalances may be detrimental to the performance of the RESS. As a result, battery controllers may periodically perform a cell balancing operation. For instance, each battery cell may be connected to a corresponding cell balancing switch and a series bypass resistor. By closing or opening the individual cell balancing switches in a string of battery cells, the battery controller is able to equalize the cell voltage or states of charge of the battery cells and thereby optimize RESS performance.

SUMMARY

The present disclosure relates to electric circuit topologies and automatic switching control methods for use in an electrical system having a rechargeable energy storage system (RESS) constructed from a pair of identical battery packs. The battery packs are electrically interconnected via a switching control circuit, with the circuit having mechanical or solid-state switches that are responsive to switching control signals from a controller, e.g., a battery system manager. The battery packs are operated in series when the switching control circuit is commanded to a first state. Responsive to the switching control signals, the switches of the circuit are commanded to a second state, at which point the battery packs are transitioned from series operation to parallel operation.

If the above-noted series-to-parallel mode transition were to occur during a period in which a threshold cell imbalance exists between the interconnected battery packs, an undesirable current spike might occur within the RESS. The present approach therefore provides various circuit topologies and associated control methods for achieving self-balancing switching control as a prelude to transitioning between series and parallel modes of operation of the dual-pack RESS described herein.

An electrical system is disclosed herein that may include a DC voltage bus and an RESS. The RESS has first and second battery packs connected to the DC voltage bus, with the battery packs having a respective plurality of battery cells. Each battery cell has a corresponding cell balancing circuit. A plurality of switches is configured to connect or disconnect the first and second battery packs to or from each other to respectively establish a series mode of operation and a parallel mode of operation.

The electrical system also includes a controller configured to detect a requested mode transition from the series mode to the parallel mode. In response to a threshold imbalance in a state of charge or a pack voltage of the first and second battery packs relative to each other, the controller automatically balances the state of charge or pack voltage via switching control of the cell balancing circuits prior to executing the requested mode transition. The controller may execute the requested mode transition when the state of charge or pack voltage is balanced.

The electrical system may include an inductor connected to the DC voltage bus.

A switching control block having a semiconductor switch and a circuit element may be connected to the DC voltage bus, with the semiconductor switch being responsive to pulse width modulation (PWM) voltage signals from the controller, such that when the semiconductor switch in an on/conducting state, energy is transferred to or from the circuit element to balance the state of charge or pack voltage when the threshold imbalance is more than a calibrated level of imbalance.

The circuit element in non-limiting embodiments may be a supercapacitor, a resistive load, or a third battery pack.

The semiconductor switch may include a first semiconductor switch responsive to a first PWM voltage signal from the controller when the state of charge of the first battery pack exceeds the state of charge of the second battery pack, and a second semiconductor switch responsive to a second PWM voltage signal from the controller when the state of charge of the second battery pack exceeds the state of charge of the first battery pack.

The plurality of switches includes a first switch positioned between the negative bus rail and a negative terminal of the first battery pack, a second switch between the positive bus rail and a positive terminal of the second battery pack, and a third switch positioned between the negative terminal of the first battery pack and the positive terminal of the second battery pack, such that the parallel mode is enabled when the third switch is open and the first and second switches are closed, and the series mode is enabled when the first and second switches are open and the third switch is closed.

The first, second, and third switches may be high-voltage contactors or relays in some configurations.

A maximum voltage capacity of the RESS in the series mode may be greater than 600-volts.

The electrical system may also include a power inverter module (PIM) connected to the DC voltage bus, an alternating current (AC) voltage bus connected to the PIM, and an electric machine connected to the AC voltage bus, with the electric machine having a rotor coupled to a load. The load may be an input member of a transmission having an output member coupled to a set of road wheels.

A method is also disclosed for balancing a state of charge or pack voltage of the above-noted RESS. The method may include detecting, via a controller, a requested mode transition from the series mode to the parallel mode, and then determining if a threshold level of imbalance is present in a state of charge or a pack voltage of the first and second battery packs relative to each other. Thereafter, the method may include, responsive to the threshold level of imbalance being present, automatically balancing the state of charge or the pack voltage using open/closed state control of the cell balancing circuits prior to executing the requested mode transition.

Figure 1:
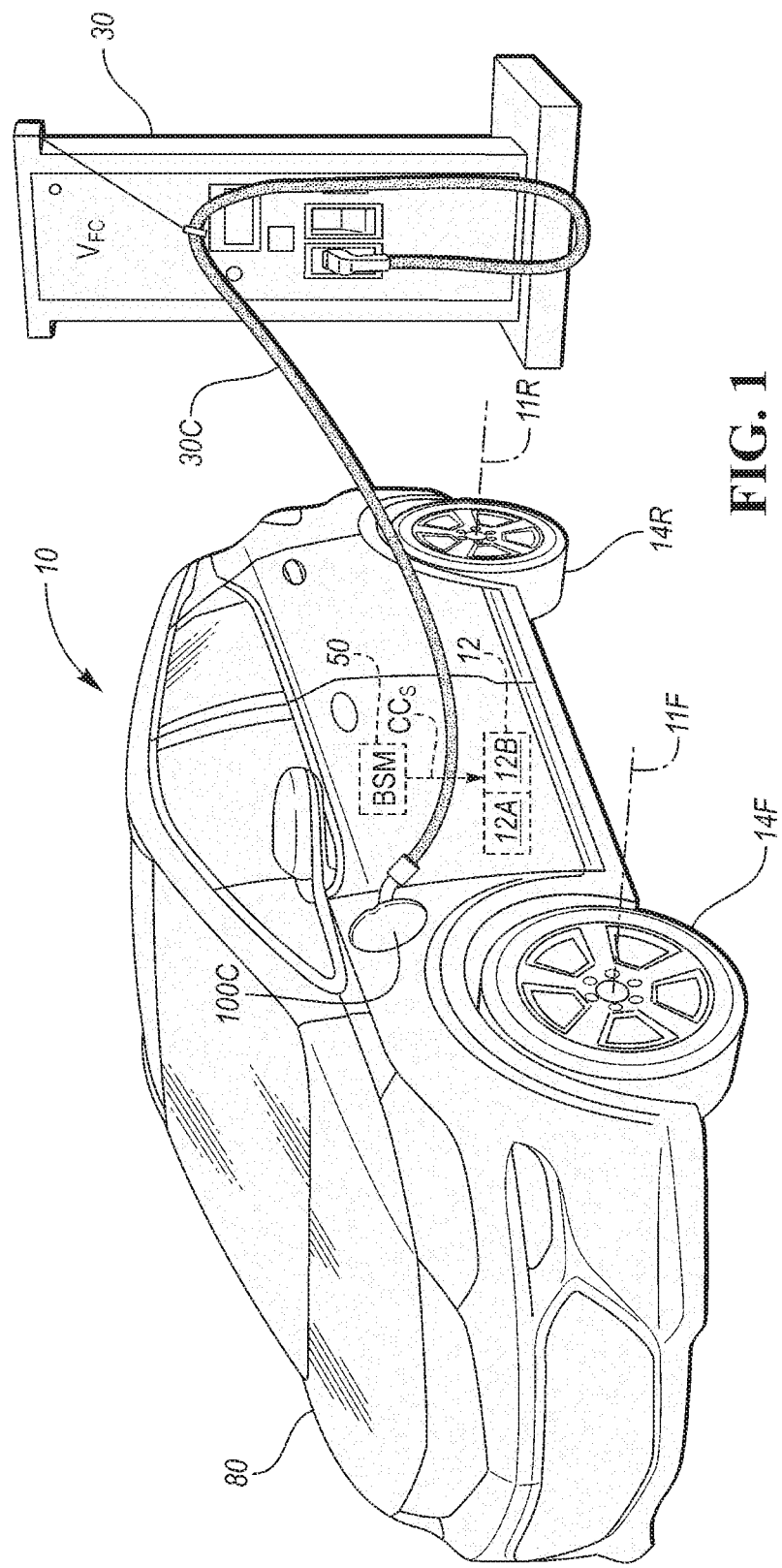
FIG. 1 is a schematic illustration of an example vehicle undergoing a direct current fast-charging operation, with the vehicle having a rechargeable energy storage system (RESS) constructed from a pair of interconnected battery packs, and having a battery controller configured to self-balance the battery packs prior to a series-parallel mode transition as described herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a vehicle 10 is depicted in FIG. 1 as an example system having a rechargeable energy storage system (RESS) 12. As described below with reference to FIGS. 2 through 6, the RESS 12 includes two identically-configured battery packs 12A and 12B, i.e., having equal maximum voltage capacities but possibly allowing for different chemistries in the internal build-up in some configurations. For instance, the battery packs 12A and 12B may have a maximum voltage capacity of 400-volts in an illustrative high-voltage embodiment, with the RESS 12 thus having a maximum voltage capacity of 800-volts, or greater than 600-volts in another embodiment. Such an embodiment may be beneficial for applications in which the RESS 12 powers a high-voltage traction function aboard the vehicle 10 or powers another load, e.g., propellers of a marine vessel or aircraft, or a drive shaft of a stationary power plant. For illustrative clarity, the example vehicle 10 of FIG. 1 will be described below without limitation.

The RESS 12 with battery packs 12A and 12B is configured to selectively provide series and parallel modes of operation. During charging, for instance, the RESS 12 may be configured to undergo series charging in which battery packs 12A and 12B are connected in electrical series and thereby receive a charging voltage at a combined voltage of the battery packs 12A and 12B, or parallel charging in which the battery packs 12A and 12B are connected in electrical parallel and thereby charged at a corresponding maximum voltage capacity of the battery packs 12A and 12B. A controller 50, e.g., a battery system manager (BSM) or other onboard electronic control module, is used to properly balance the battery packs 12A and 12B in terms of cell voltage or state of charge prior to a transition from series mode to parallel mode or vice versa. Thus, the controller 50 is configured to detect a requested mode transition from the series mode of operation to the parallel mode of operation, whether such a request initiated by an operator's actions, e.g., indirectly via torque and/or braking requests, or autonomously by the controller 50 or another control unit. Responsive to a threshold imbalance being present in a state of charge or pack voltage of the first and second battery packs 12A and 12B relative to each other, the controller 50 automatically balances the state of charge or pack voltage, doing so using open/closed state control of the cell balancing circuits shown in FIG. 2A. The controller 50 may also execute the requested mode transition when the state of charge or pack voltage is balanced, or another control unit may be responsible for such a control action.

The RESS 12 may be used as part of the vehicle 10 of FIG. 1 or as part of another electrical system such as a stationary or mobile power plant, robot, or platform. For vehicular applications, non-motor vehicles such as aircraft, marine vessels, and rail vehicles may enjoy similar benefits. For illustrative consistency, an example application of the RESS 12 as an integral part of the vehicle 10 in a motor vehicle context will be described hereinafter without limiting the present disclosure to such an embodiment.

The vehicle 10 of FIG. 1 is depicted as undergoing a direct current (DC) fast-charging operation in which the RESS 12 is electrically connected to an off-board DC fast-charging station 30 via a charging port 100C located at an accessible part of a body 80 of the vehicle 10. The charging port 100C is connected to a DC charge connector (not shown) disposed at the end of a length of charging cable 30C. Such a connector may be embodied as an SAE J1772, a CHAdeMO charge connector, or another suitable regional or national standard charging plug or connector. However, the present teachings are independent of the charging standard ultimately employed in a DC fast-charging operation involving the DC fast-charging station 30, and therefore the above-noted examples are merely illustrative of the present teachings.

The example vehicle 10 of FIG. 1 includes front and rear drive wheels 14F and 14R, respectively, which rotate about a respective front and rear drive axis 11F and 11R. The vehicle 10 may be variously embodied as a plug-in electric vehicle having the RESS 12, e.g., a multi-cell lithium ion, zinc-air, nickel-metal hydride, or lead acid type, that can be selectively recharged via a DC fast-charging voltage ($V_{Fc}$) from the off-board DC fast-charging station 30. When the vehicle 10 is in operation, switching control of the RESS 12 is performed by the controller 50 via switching control signals (arrow $CC_S$) to transition the RESS 12 from a series operating mode to a parallel operating mode, and vice versa.

Figure 2:
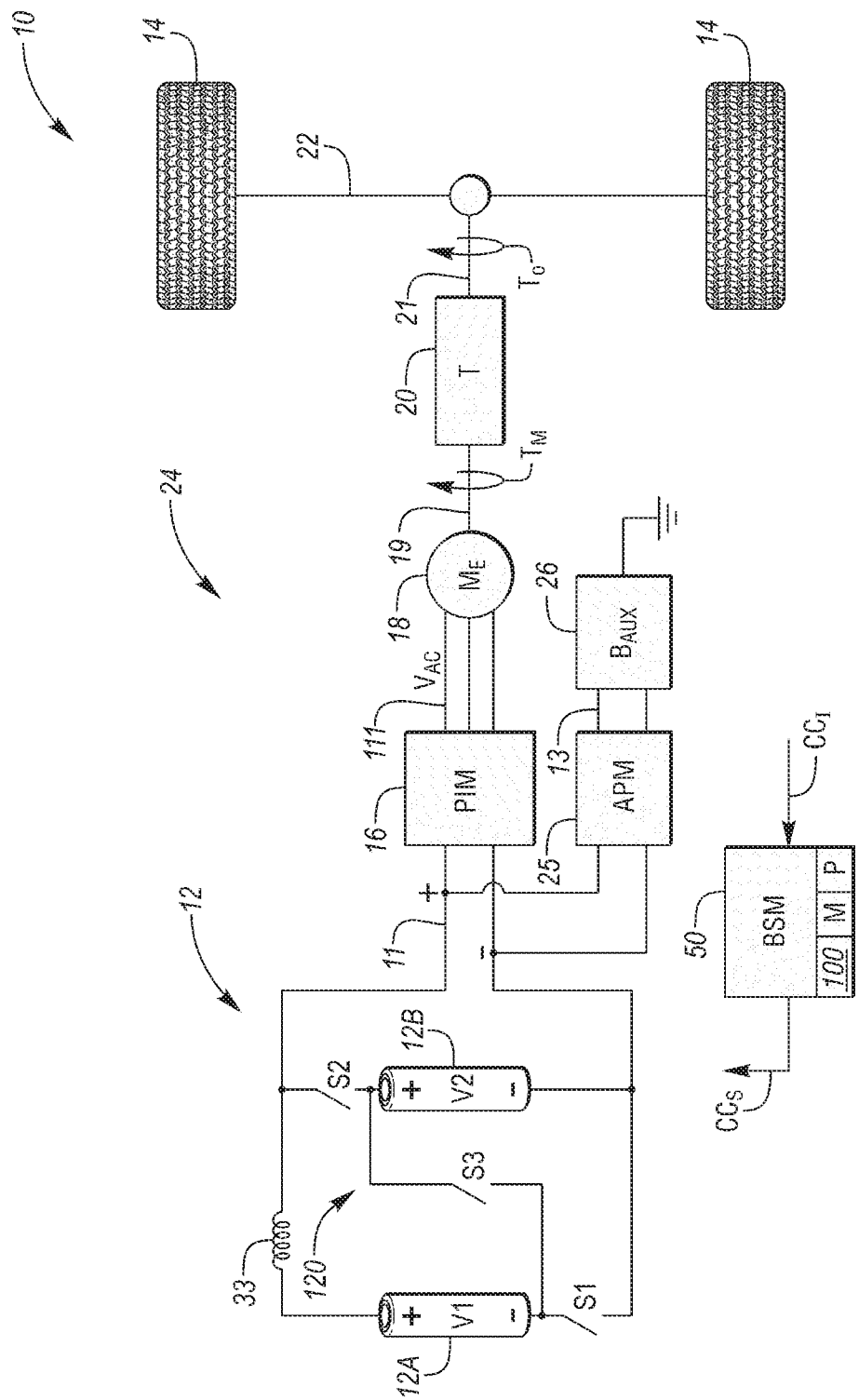
FIG. 2 is a schematic illustration of a vehicle having a dual-pack RESS and an associated controller usable as part of the example vehicle shown in FIG. 1.

Referring to FIG. 2, the vehicle 10 includes an electrified powertrain 24 having the RESS 12, a power inverter module (PIM) 16, an electric machine ($M_E$) 18, and a transmission (T) 20. As will be appreciated by one of ordinary skill in the art, the electrified powertrain 24 includes a DC voltage bus 11 and an AC voltage bus 111 (VAC), with the PIM 16 operable for inverting a DC voltage to an AC voltage and vice versa as needed, e.g., in response to pulse width modulation signals as will be appreciated by those of ordinary skill in the art. To that end, three sets of upper and lower switches (not shown) internal to the PIM 16, e.g., IGBTs or MOSFETs, have binary on/off switching states that are controlled in real time to generate a desired output voltage from the PIM 16.

Additional components may be connected to the DC voltage bus 11, such as an auxiliary power module (APM)

25. A low-voltage/auxiliary battery ($B_{AUX}$) 26 may be connected to the APM 25 via another DC voltage bus 13, with the DC voltage bus 13 having a potential of 12-15-volts in a possible embodiment. The AC voltage bus 111 is connected to individual phase windings of the electric machine 18, with a three-phase embodiment of the electric machine 18 depicted in FIG. 3. The energized electric machine 18 delivers motor torque (arrow $T_M$) to an input member 19 of the transmission 20. Output torque (arrow $T_O$) is ultimately transferred to an output member 21 of the transmission 20, and ultimately to drive wheels 14, e.g., the front and/or rear 14F and 14R shown in FIG. 1, via one or more drive axles 22.

With respect to switching operation of the dual-pack RESS 12, switching state control is performed by the controller 50 using a processor (P) and memory (M). Switching state control occurs via transmission of switching control signals (arrow $CC_S$). The memory (M) includes tangible, non-transitory memory, e.g., read only memory, whether optical, magnetic, flash, or otherwise. The controller 50 also includes application-sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

The controller 50 is programmed to execute instructions 100 embodying a self-balancing switching control method, with the controller 50 receiving input signals (arrow $CC_I$) indicative of a driver-requested or autonomously-requested operating mode of the electrified powertrain 24. In response, the controller 50 outputs the switching control signals (arrow $CC_S$) to a switching circuit 120 of the RESS 12. The input signals (arrow $CC_I$) may be determined during charging as part of ongoing communication between the controller 50 and the DC fast-charging station 30 of FIG. 1 upon connection of the vehicle 10 to the station 30, such as when the DC fast-charging station 30 communicates its maximum charging voltage to the controller 50 and during an active charging event of the RESS 12, or during ongoing drive operation of the vehicle 10.

In the representative embodiment of FIG. 2, the switching circuit 120 includes respective first, second, and third switches S1, S2, and S3. While depicted as three high-voltage mechanical switches, solenoid-driven contactors or relays for illustrative simplicity, the switches S1, S2, and S3 may be alternatively embodied as solid-state/semiconductor switches. Within the RESS 12, the battery packs 12A and 12B have a respective first and second pack voltage V1 and V2. During high-voltage series charging of the RESS 12, e.g., 600-volt or higher charging process in which the RESS 12 is connected to the DC fast-charging station 30 of FIG. 1, the controller 50 determines the corresponding first and second pack voltages V1 and V2, e.g., via onboard measurement and/or calculation, as will be appreciated by those of ordinary skill in the art. The controller 50 may proceed with self-balancing when the first pack voltage V1 exceeds the second pack voltage V2 by a calibrated amount. An optional inductor 33, such as a 20 µH inductive coil or winding in the example 800-volt embodiment, may be used to prevent an overcurrent condition and voltage oscillation when switching from series to parallel operating modes.

Figure 2A:
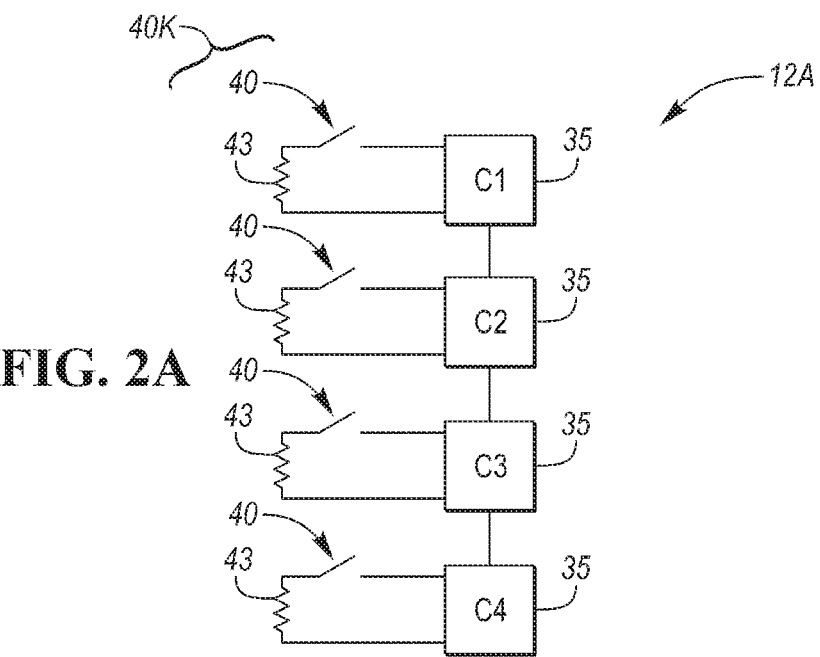
FIG. 2A is a schematic illustration of example strings of battery cells usable as part of the dual-pack RESS of FIG. 2.

Referring briefly to FIG. 2A, battery pack 12A (and battery pack 12B, omitted for simplicity) has a corresponding string of battery cells 35, with the battery cells 35 also labeled C1, C2, C3, . . . CN. The number (N) of battery cells 35 in the string is application-specific. For instance, 96 such battery cells 35 may be used in an example embodiment. The corresponding cell voltage for each battery cell 35 may be about 4.0-volts to 4.5-volts. Each battery cell 35 in turn has a corresponding cell balancing circuit 40K including a cell balancing switch 40 and a bypass resistor 43. Thus, a given battery cell 35 may be selectively bypassed by operation of the controller 50 by closing a corresponding one of the cell balancing switches 40. This enables excess energy to be drained from the battery pack 12A or 12B having a higher pack voltage, with such energy dissipated in the bypass resistor 43 as heat. As will be appreciated by one of ordinary skill in the art, the controller 50 may use a comparator circuit (not shown) informed by cell voltage measurements, with each battery cell 35 reporting its corresponding cell voltage to the controller 50 during ongoing control of the RESS 12. Thus, the present self-balancing operation is used as a precursor to transitioning from a series mode as shown, i.e., with switch S3 closed/conducting and switches S1 and S2 open/non-conducting, to a parallel operating mode in which the switch S3 would be open and the switches S1 and S2 would be closed.

Figure 3:
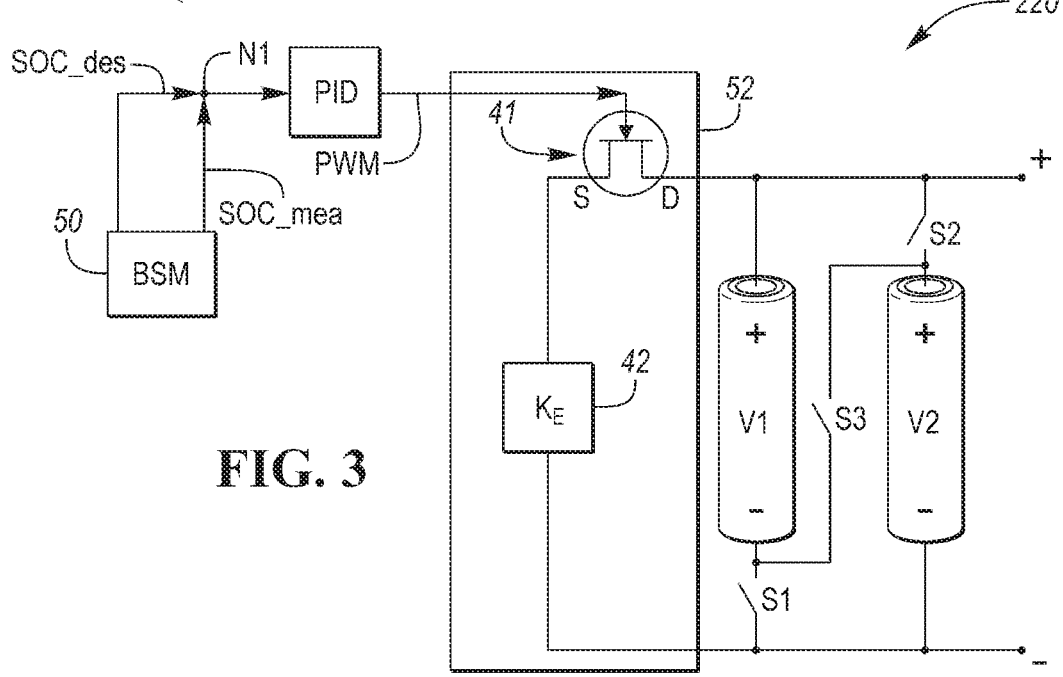
FIG. 3 is schematic circuit diagram of an alternative embodiment of the dual-pack RESS shown in FIG. 2.

FIG. 3 depicts an alternative embodiment of the RESS 12 includes another switching circuit 220, in which automatic cell balancing is conducted before switching from a series mode of operation to a parallel mode. Such an embodiment may be used when the respective states of charge of battery packs 12A and 12B differ from each other by a predetermined amount, e.g., by more than 5%. A switching control block 52, which may be part of the vehicle 10 or the DC fast-charging station 30 of FIG. 1 in different embodiments, is used in conjunction with a proportional integral derivative (PID) logic block 55. The PID logic block 55, shown separately from the controller 50 for clarity but possibly implemented as programmed control logic thereof, receives control inputs in the form of a measured state of charge (SOC_mea) and a desired state of charge (SOC_des), with the identities of each control input variable being readily available to the controller 50 and described below with reference to FIG. 4.

A difference between the measured state of charge (SOC_meas) and the desired state of charge (SOC_des) is determined at operating node N1 and fed into the PID logic block 55. The PID logic block 55 hereafter generates a PWM voltage signal and transmits the PWM voltage signal to the switching control block 52. Within the switching control block 52, a semiconductor switch 41, e.g., a MOSFET as shown, an IGBT, or other suitable semiconductor-based/solid-state switch, is placed in series with a circuit element ($K_E$) 42 across the positive (+) and negative (−) bus rails of the DC voltage bus 11 shown in FIG. 2. Receipt of the PWM signal when output from the PID logic block 55 selectively transitions the semiconductor switch 41 to an on/conducting state. In this manner, energy from the battery packs 12A or 12B may be offloaded to or pulled from the circuit element 42 as needed. The semiconductor switch 41 is thus responsive to PWM voltage signals from the controller 50, such that when the semiconductor switch 41 is in an on/conducting state, energy is transferred to and/or from the circuit element 42 to balance the state of charge or pack voltage.

Figure 3A:
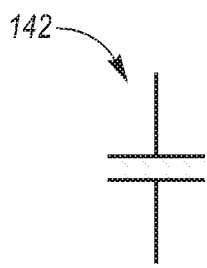
FIGS. 3A, 3B, and 3C are schematic illustrations of alternative embodiments of a circuit element usable as part of the dual-pack RESS described herein.
Figure 3B:
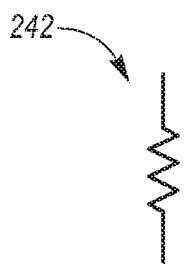
Figure 3C:
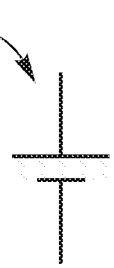

As shown in FIGS. 3A, 3B, and 3C, respectively, the circuit element ($K_E$) 42 depicted in FIG. 3 may be alternatively embodied as a supercapacitor 142, a resistive load 242 of a component in the vehicle 10, or the DC fast-charging station 30 of FIG. 1, represented schematically as a battery 342 in FIG. 3C. When the circuit element 42 of FIG. 3 is embodied as the supercapacitor 142 shown in FIG. 3A, the controller 50 of FIG. 3 may use the supercapacitor 142 to charge the weaker/discharge the stronger of the two battery packs 12A or 12B, with the terms "weaker" and "stronger" referring to lower or higher state of charge or pack voltage in different embodiments. The embodiment of FIG. 3B enables excess energy in the stronger of the battery packs 12A and 12B to be discharged to the resistive load 242, while the embodiment FIG. 3C enables the weaker of the two battery packs 12A and 12B to be charged using the battery 342.

Figure 4:
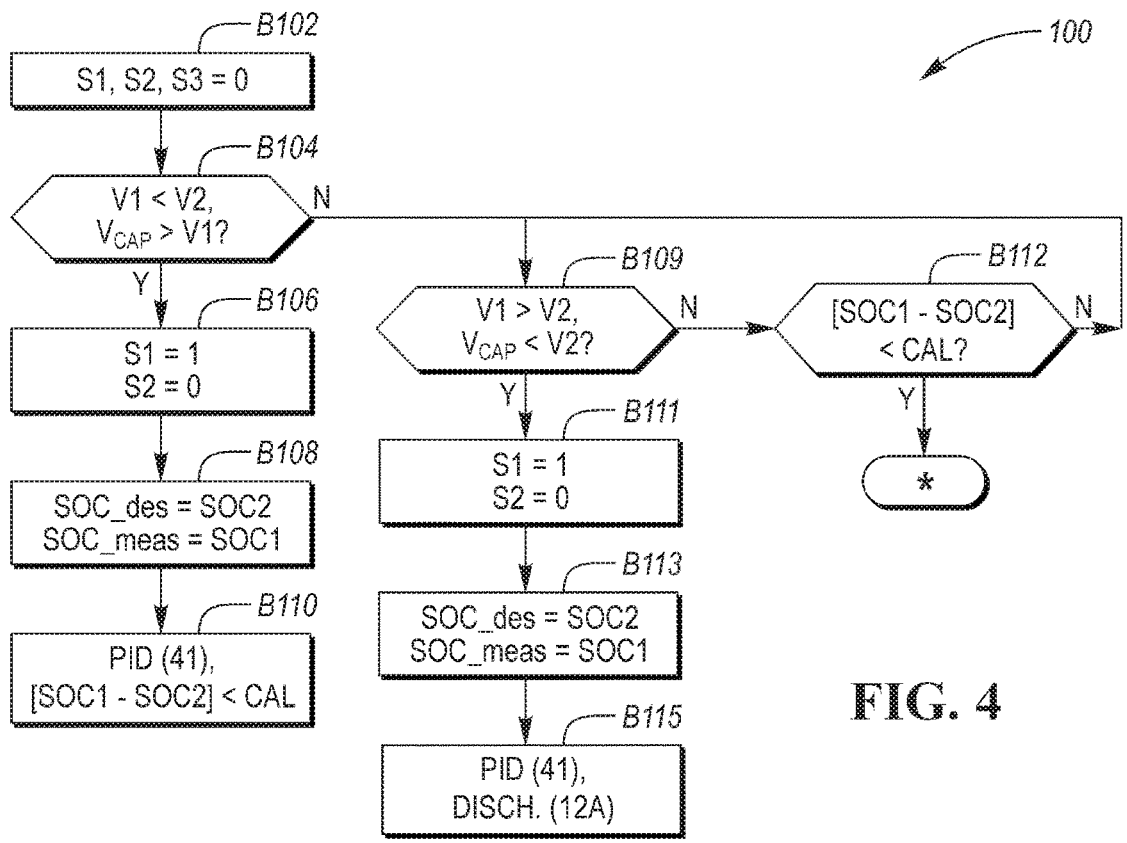
FIG. 4 is a flow chart describing an example method for balancing the dual-pack RESS of FIG. 3.

Referring to FIG. 4 in conjunction with the example circuit topology of FIG. 3, the instructions 100 noted above embody an example self-balancing switching control methodology, and therefore the method is referred to hereinafter as method 100 for clarity. An example embodiment of method 100 begins at block B102. The controller 50 opens the switches S1, S2, and S3 via transmission of the switching control signals (arrow $CC_S$). For instance, a binary value of 0 may be used to open the switches, as represented by "S1, S2, S3=0" in FIG. 4. The method 100 proceeds to block B104 when the switches S1, S2, and S3 are in an open state.

At block B104, the controller 50 determines whether the pack voltage (V1) of battery pack 12A is less than the pack voltage (V2) of the battery pack 12B. At the same time, the controller 50 determines whether the circuit element 42, in this example the supercapacitor 142 of FIG. 3A, has a capacitor voltage (Vcap) that exceeds the pack voltage (V1) of the battery pack 12A. The method 100 proceeds to block B106 when this combined condition is detected, and to B109 in the alternative.

Block B106 includes closing the switch S1 via transmission of control signals (arrow $CC_S$) to switch S1, such as by transmitting a binary value of 1 ("S1=1"). Switches S2 and S3 remain open at block B106. The method 100 then proceeds to block B108.

Block B108 is arrived at after determining that the battery pack 12B is stronger than battery pack 12A, and that excess energy is stored in supercapacitor 142. Block B108 includes determining the state of charge (SOC) of the battery pack 12A, i.e., SOC_meas=SOC1, with SOC1 being the state of charge of battery pack 12A. The desired SOC in this instance is that of battery pack 12B, such that SOC_des=SOC2, with SOC2 being the state of charge of battery pack 12B. The method 100 then proceeds to block B110.

Block B109 includes determining via the controller 50 whether the pack voltage (V1) of battery pack 12A exceeds the pack voltage (V2) of battery pack 12B. At the same time, the controller 50 determines whether circuit element 42 of FIG. 3 has a capacitor voltage (Vcap) that is less than the pack voltage (V2) of the battery pack 12B. The method 100 proceeds to block B111 when this combined condition is detected, and to B112 in the alternative.

At block B110, the controller 50 next implements proportional-integral-derivative (PID) control via the PID logic block 55 of FIG. 3 to charge the battery pack 12A using the excess stored energy in the supercapacitor 142 (FIG. 3A). Block B110 continues until the SOC imbalance is within a calibrated threshold, i.e.:

|SOC1−SOC2|<CAL.

The method 100 is complete (*).

Block B111 includes closing switch S1 via transmission of control signals (arrow $CC_S$) to switch S1, once again with a binary 1 value used in this example for closing the switch S1. Switches S2 and S3 remain open. The method 100 then proceeds to block B113.

Block B112 includes determining whether the present SOC imbalance is less than a calibrated threshold (CAL), i.e.:

|SOC1−SOC2|<CAL.

If so, the method 100 is complete (*). The method 100 repeats block B104 when the present SOC imbalance exceeds the calibrated threshold (CAL).

Block B113 is executed by the controller 50 after determining that battery pack 12A is stronger than battery pack 12B, and that excess energy may be stored in the supercapacitor 142 of FIG. 3A. Block B113 includes determining the SOC of the battery pack 12A, i.e., SOC_meas=SOC1. The desired SOC in this instance is that of battery pack 12A, i.e., SOC_des=SOC2. The method 100 then proceeds to block B115.

At block B115, the controller 50 implements PID control via PID logic block 55 of FIG. 3 to discharge energy from battery pack 12A to the supercapacitor 142 (FIG. 3A). Block B115 continues until the SOC imbalance is within a calibrated (CAL) threshold, or as noted above, until:

|SOC1−SOC2|<CAL.

The method 100 is then complete (*).

Alternative implementations of the circuit topology shown in FIG. 3, which conducts charge balancing operations before switching from series to parallel modes while switch S3 remains open, replace the supercapacitor 142 of FIG. 3A with the resistive load 242 (FIG. 3B) or DC fast-charging station 30 (FIG. 3C). Thus, if the DC fast-charging station 30 provides both 800-volt and 400-volt charging options, for instance, an SOC imbalance may prompt the controller 50 to charge the weaker battery pack 12A or 12B using the available 400-volt charge.

For instance, if battery pack 12A is weaker than battery pack 12B, the controller 50 may close switch S1 and open switches S2 and S3, use the SOC of battery pack 12B as the desired SOC (i.e., SOC_des=SOC2), and then use the SOC of battery pack 12A as the other control input to the PID logic block 55, i.e., SOC_meas=SOC1. If the charging station 30 does not provide the 400-volt charging in this example, the controller 50 may discharge the stronger battery pack 12A or 12B through the resistive load 242 of FIG. 3B with minimal wasted energy.

Figure 5:
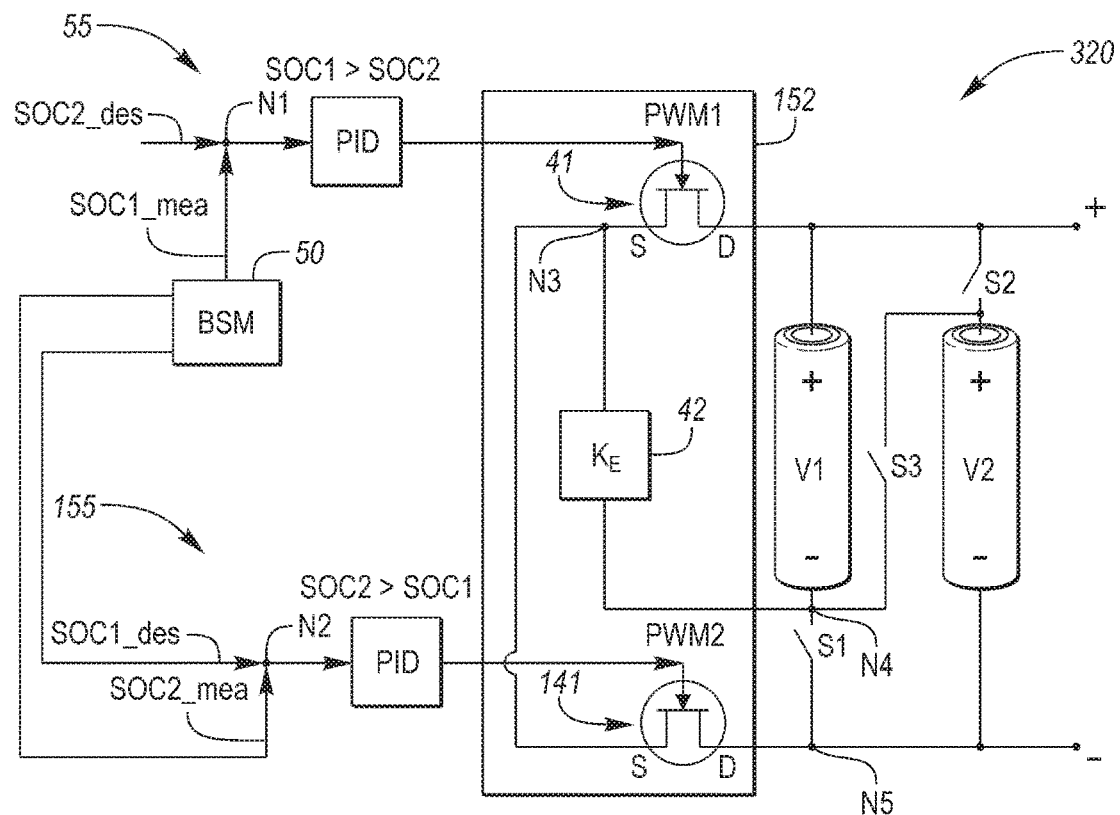
FIG. 5 is schematic circuit diagram of an alternative embodiment of the dual-pack RESS shown in FIGS. 2 and 3.

FIG. 5 depicts an alternative embodiment to the circuit topology shown in FIG. 3 in which a switching circuit 320 is used. Here, PID logic blocks 55 and 155 are used, with the inputs differing as shown. That is, if battery pack 12A is stronger than battery pack 12B, e.g., SOC1>SOC2, then PID logic block 55 is active. PID logic block 155, which has a node N2 analogous to node N1, is active when the opposite condition exists, i.e., SOC2>SOC1.

Within another switching logic block 152, semiconductor switches 41 and 141 are respectively arranged on the positive (+) and negative (−) bus rails as shown. The circuit element ($K_E$) 42 is used within the switching logic block 152, with circuit element 42 connected to the positive (+) bus rail at node N3 and to another node N4 located between the negative terminal of battery pack 12A and switch S1. Switch S1 in turn is connected to node N4 and to another node N5 located on the negative (−) bus rail. The topology of FIG. 5 may be used to save additional energy, retaining the option of using an existing electrical component of the vehicle 10 as a resistive load 242 (FIG. 3B) or a supercapacitor 142 as in FIG. 3A.

Figure 6:
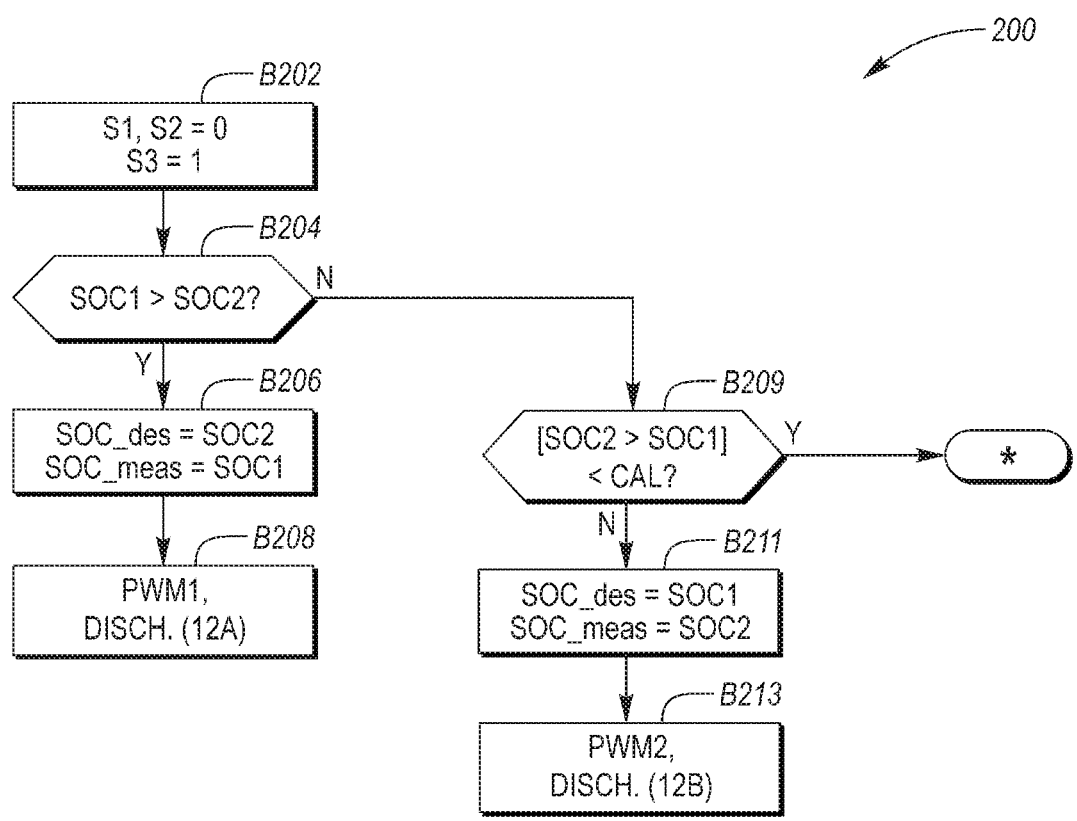
FIG. 6 is a flow chart describing an example method for balancing the alternative dual-pack RESS of FIG. 5.

Referring to FIG. 6, a method 200 is shown as an alternative embodiment of the method 100, specifically one usable with the dual-PID circuit topology of FIG. 5. Method 200 commences with block B202 wherein the controller 50 command switches S1 and S2 to open ("S1, S2=0") and switch S3 to close ("S3=1"). The method 200 then proceeds to block B204.

At block B204, the controller 50 compares the states of charge of battery modules 12A and 12B, i.e., SOC1 and SOC2. The method 200 proceeds to block B206 when SOC1>SOC2, and to block B209 in the alternative.

Block B206 is arrived at after determining that the SOC of battery pack 12A exceeds that of battery pack 12B. Block B206 includes setting the desired SOC to that of the stronger battery pack 12B, i.e., SOC_des=SOC2 in this example. The measured SOC is therefore that of battery back 12A, i.e., SOC_meas=SOC1. The method 200 then proceeds to block B208.

At block B208, the controller 50 next implements PID control via PID logic block 55 of FIG. 5 in order to discharge energy from battery pack 12A to the circuit component 42. Block B208 continues until the SOC imbalance is within the above-noted calibrated threshold:

|SOC1−SOC2|<CAL.

The method 200 is then finished (*).

Block B209 includes determining whether the state of charge of battery pack 12B exceeds that of battery pack 12A by a calibrated (CAL) amount, i.e.:

|SOC2>SOC2|<CAL.

If so, the method 200 is complete (*). The method 200 proceeds to block B211 when the state of charge of the battery pack 12B exceeds that of battery pack 12A by more than the calibrated amount.

At block B211, the controller 50 sets the desired SOC to that of the weaker battery pack 12B, i.e., SOC_des=SOC1. The measured SOC is therefore that of battery back 12B, i.e., SOC_meas=SOC2. The method 200 then proceeds to block B213.

Block B213 entails implementing PID control via PID logic block 155 of FIG. 5 to discharge energy from battery pack 12B to the circuit component 42. Block B213 continues until the SOC imbalance is within the above-noted calibrated (CAL) threshold:

|SOC1−SOC2|<CAL.

The method 200 is finished (*).

Thus, the methods 100 and 200 may be used to provide self-balancing as a prelude to a series-parallel mode switching operation in a dual-pack RESS 12 of the type shown in FIGS. 1 and 2. The methods 100 and 200, as will be appreciated, enable a self-balancing process that includes detecting, via a controller, a requested mode transition from the series mode to the parallel mode as described above, with the controller 50 thereafter determining if a threshold imbalance is present in a state of charge or pack voltage of the first and second battery packs relative to each other. Responsive to the threshold imbalance being present, the controller 50 may automatically balance the state of charge or pack voltage using open/closed state control of the cell balancing circuits shown in FIG. 2A, doing so prior to execution of the requested mode transition.

Two identical high-voltage battery packs, i.e., 12A and 12B, may be connected in series or parallel to selectively achieve 800-volt series and 400-volt parallel charging or discharging modes, or series/parallel modes at different voltage levels in which the parallel mode is conducted at half the voltage capacity of the series mode. The topologies enable "voltage downshifting" to occur when transitioning from the high-voltage series mode to the lower-voltage parallel mode to avoid frequent switching between the battery packs 12A an 12B during charging and discharging. The controller 50 can therefor use switching control block 52 of FIGS. 3 and 5 as a controllable balancing circuit to properly balance the two battery packs 12A and 12B.

In a possible approach, the simplified embodiment of FIG. 2 may be used for small imbalances, e.g., 3-5 percent or less. The switching control block 152 of embodiment FIG. 5, using the supercapacitor 142 of FIG. 3A as circuit element 42, may be used for larger imbalances to either charge the weaker of or discharge the stronger of the two battery packs 12A or 12B. When using the resistive load 242 of FIG. 3B, which is already present in the vehicle 10 and thus requires no additional hardware, may enable discharge of the stronger battery pack 12A or 12B, with excess energy dumped to the resistive load 142. The embodiment of FIG. 3C (DC fast-charging station 30) can still be used to charge the weaker of battery pack 12A and 12B, and thus remains a viable option in the embodiment of FIG. 5.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
    a direct current (DC) voltage bus having a positive bus rail and a negative bus rail;
    a rechargeable energy storage system (RESS) having:
        first and second battery packs connected to the DC voltage bus, the first and second battery packs having a respective plurality of battery cells, wherein each of the battery cells has a corresponding cell balancing circuit; and
        a plurality of switches configured to connect or disconnect the first and second battery packs to or from each other to respectively establish a series mode and a parallel mode; and
    a controller configured to:
        detect a requested mode transition from the series mode to the parallel mode; and
        responsive to a threshold imbalance in a state of charge or pack voltage of the first and second battery packs relative to each other, automatically balance the state of charge or pack voltage of the first and second battery packs relative to each other when in the series mode via switching control of the cell balancing circuits prior to executing the requested mode transition.

2. The electrical system of claim 1, wherein the controller is further configured to execute the requested mode transition when the state of charge or pack voltage of the first and second battery packs relative to each other is balanced.

3. The electrical system of claim 1, further comprising: an inductor connected to the DC voltage bus.

4. The electrical system of claim 1, further comprising:
    a switching control block having a semiconductor switch and a circuit element connected to the DC voltage bus, the semiconductor switch being responsive to pulse width modulation (PWM) voltage signals from the controller, such that when the semiconductor switch in an on/conducting state, energy is transferred to or from the circuit element to balance the state of charge or pack voltage of the first and second battery packs relative to each other when the threshold imbalance is more than a calibrated level of imbalance.

5. The electrical system of claim 4, wherein the calibrated level of imbalance is at least 3 percent.

6. The electrical system of claim 4, wherein the circuit element is a supercapacitor.

7. The electrical system of claim 4, wherein the circuit element is a resistive load.

8. The electrical system of claim 4, wherein the circuit element is a third battery pack.

9. The electrical system of claim 4, wherein the semiconductor switch includes:
- a first semiconductor switch responsive to a first PWM voltage signal from the controller when the state of charge of the first battery pack exceeds the state of charge of the second battery pack; and
- a second semiconductor switch responsive to a second PWM voltage signal from the controller when the state of charge of the second battery pack exceeds the state of charge of the first battery pack.

10. The electrical system of claim 1, wherein the plurality of switches includes a first switch positioned between the negative bus rail and a negative terminal of the first battery pack, a second switch between the positive bus rail and a positive terminal of the second battery pack, and a third switch positioned between the negative terminal of the first battery pack and the positive terminal of the second battery pack, such that the parallel mode is enabled when the third switch is open and the first and second switches are closed, and the series mode is enabled when the first and second switches are open and the third switch is closed.

11. The electrical system of claim 10, wherein the first, second, and third switches are high-voltage contactors or relays.

12. The electrical system of claim 1, wherein a maximum voltage capacity of the RESS in the series mode is greater than 600-volts.

13. The electrical system of claim 1, further comprising:
- a power inverter module (PIM) connected to the DC voltage bus;
- an alternating current (AC) voltage bus connected to the PIM; and
- an electric machine connected to the AC voltage bus and having a rotor coupled to a load.

14. The electrical system of claim 13, wherein the load is an input member of a transmission having an output member coupled to a set of road wheels.

15. A method for balancing a state of charge or pack voltage of a rechargeable energy storage system (RESS) having first and second battery packs connected to a direct current (DC) voltage bus having a positive bus rail and a negative bus rail, each of the first and second battery packs having a respective plurality of battery cells with a corresponding cell balancing circuit, the RESS having a plurality of switches configured to selectively connect the first and second battery packs together in a series mode and a parallel mode, the method comprising:

- detecting, via a controller, a requested mode transition from the series mode to the parallel mode;
- determining if a threshold level of imbalance is present in the state of charge or pack voltage of the first and second battery packs relative to each other; and
- responsive to the threshold level of imbalance being present, automatically balancing the state of charge or pack voltage of the first and second battery packs relative to each other when in the series mode using open/closed state control of the cell balancing circuits prior to executing the requested mode transition.

16. The method of claim 15, further comprising: executing the requested mode transition via the controller when the state of charge or pack voltage of the first and second battery packs relative to each other is balanced.

17. The method of claim 15, further comprising:
responsive to the threshold level of imbalance being more than a calibrated level of imbalance, transmitting a pulse width modulation (PWM) voltage signal to a switching control block, the switching control block having a semiconductor switch and a circuit element connected to the DC voltage bus, wherein the semiconductor switch is configured to transition to an on/conducting state in response to the PWM voltage signal to transfer energy to and/or from the circuit element and thereby balance the state of charge or pack voltage of the first and second battery packs relative to each other.

18. The method of claim 17, wherein the semiconductor switch includes:
- a first semiconductor switch responsive to a first PWM voltage signal when the state of charge of the first battery pack exceeds the state of charge of the second battery pack; and
- a second semiconductor switch responsive to a second PWM voltage signal when the state of charge of the second battery pack exceeds the state of charge of the first battery pack.

19. The method of claim 15, wherein the plurality of switches includes a first switch between the negative bus rail and a negative terminal of the first battery pack, a second switch between the positive bus rail and a positive terminal of the second battery pack, and a third switch between the negative terminal of the first battery pack and the positive terminal of the second battery pack, the method further comprising:
- enabling the parallel mode by opening the third switch and closing the first and second switches; and
- enabling the series mode by opening the first and second switches and closing the third switch.

20. An electrical system comprising:
- a direct current (DC) voltage bus having a positive bus rail and a negative bus rail;
- a rechargeable energy storage system (RESS) configured to charge during a fast-charging event and the RESS includes:
  - first and second battery packs connected to the DC voltage bus, the first and second battery packs having a respective plurality of battery cells, wherein each of the battery cells has a corresponding cell balancing circuit; and
  - a plurality of switches configured to connect or disconnect the first and second battery packs to or from each other to respectively establish a series mode of operation and a parallel mode of operation;
- wherein a maximum voltage capacity of the RESS in the series mode of operation is greater than 600-volts; and a controller configured to:
> detect a requested mode transition from the series mode of operation to the parallel mode of operation; and
> responsive to a threshold imbalance in a state of charge or pack voltage of the first and second battery packs relative to each other, automatically balance the state of charge or pack voltage of the first and second battery packs relative to each other when in the series mode of operation via switching control of the cell balancing circuits prior to executing the requested mode transition to the parallel mode of operation.

\* \* \* \* \*